United States Patent
Capodanno et al.

(10) Patent No.: US 11,144,027 B2
(45) Date of Patent: Oct. 12, 2021

(54) FUNCTIONAL SAFETY CONTROLS BASED ON SOFT ERROR INFORMATION

(71) Applicant: Intel Corporation, Santa Clara, CA (US)

(72) Inventors: Giuseppe Capodanno, Lucca (IT); Jyotika A. Athavale, Chandler, AZ (US); Riccardo Mariani, Calci (IT)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 16/457,929

(22) Filed: Jun. 29, 2019

(65) Prior Publication Data

US 2019/0324422 A1  Oct. 24, 2019

(51) Int. Cl.
| | | |
|---|---|---|
| *G06F 11/00* | (2006.01) | |
| *G05B 19/042* | (2006.01) | |
| *G06F 11/07* | (2006.01) | |
| *G06F 11/14* | (2006.01) | |
| *G05D 1/00* | (2006.01) | |
| *G05D 1/02* | (2020.01) | |
| *G11B 20/18* | (2006.01) | |

(52) U.S. Cl.
CPC .......... *G05B 19/0428* (2013.01); *G06F 11/07* (2013.01); *G06F 11/076* (2013.01); *G06F 11/0736* (2013.01); *G06F 11/0781* (2013.01); *G06F 11/14* (2013.01); *G05B 2219/24008* (2013.01); *G05D 1/0088* (2013.01); *G05D 1/0214* (2013.01); *G05D 2201/0213* (2013.01); *G11B 20/18* (2013.01)

(58) Field of Classification Search
CPC .......... G06F 11/1402; G06F 11/1405
USPC .......... 714/1–57
See application file for complete search history.

(56) References Cited

U.S. PATENT DOCUMENTS

| 2013/0096902 A1* | 4/2013 | Bose ............ G01R 31/318357 703/14 |
| 2013/0268822 A1* | 10/2013 | Manoochehri ...... G06F 11/1064 714/758 |

(Continued)

OTHER PUBLICATIONS

"Road Vehicles—Functional safety—Part 11: Guideline on 4 application of ISO 26262 to semiconductors", ISO FDIS 26262-11:2017(E), ISO 26262-11:2018(E), ISO TC 22/SC 32/WG 8; 2017; 179 pages.

(Continued)

*Primary Examiner* — Sarai E Butler
(74) *Attorney, Agent, or Firm* — Alliance IP, LLC

(57) ABSTRACT

Soft error data describing soft errors predicted to affect at least a particular hardware component of a computing system are used to determine functional safety metric values. The computing system is to control at least a portion of physical functions of a machine using the particular hardware component. Respective soft error rates are determined for each of a set of classifications based on the soft errors described in the soft error data. Derating of the soft error rates are performed based on a set of one or more vulnerability factors to generate derated error rate values for each of the set of classifications. The functional safety metric value is determined from the derated error rate values to perform a functional safety analysis of the computing system.

19 Claims, 10 Drawing Sheets

(56) References Cited

U.S. PATENT DOCUMENTS

| | | | | |
|---|---|---|---|---|
| 2014/0200699 A1* | 7/2014 | Vincelli | ............... | G06F 11/008 |
| | | | | 700/105 |
| 2014/0258658 A1* | 9/2014 | Best | ..................... | G06F 3/0619 |
| | | | | 711/162 |
| 2017/0285585 A1* | 10/2017 | Weast | .................... | G06N 5/046 |
| 2019/0034251 A1* | 1/2019 | Sridharan | ........... | G06F 11/3037 |
| 2019/0102242 A1* | 4/2019 | Sullivan | ............. | G06F 11/1497 |
| 2019/0176838 A1* | 6/2019 | Kakoee | ............ | B60W 50/0205 |

OTHER PUBLICATIONS

Czerny, Barabara J. et al., "ISO 26262, Functional Safety Draft International Standard for Road Vehicles: Background, Status and Overview," General Motors Research and Development, ISSC 2010, Minneapolis, Minnesota; 2010; 160 pages.

Debouk, Rami et al., "Overview of the 2nd Edition of ISO26262: Functional Safety-Road Vehicles," GM Research and Development, ISSC 2018 Phoenix, Arizona; Aug. 16, 2018; 25 pages.

Nguyen, Hang T. et al., "Chip-Level Soft Error Estimation Method," IEEE Transactions on Device and Materials Reliability, vol. 5, No. 3, Sep. 2005; 17 pages.

\* cited by examiner

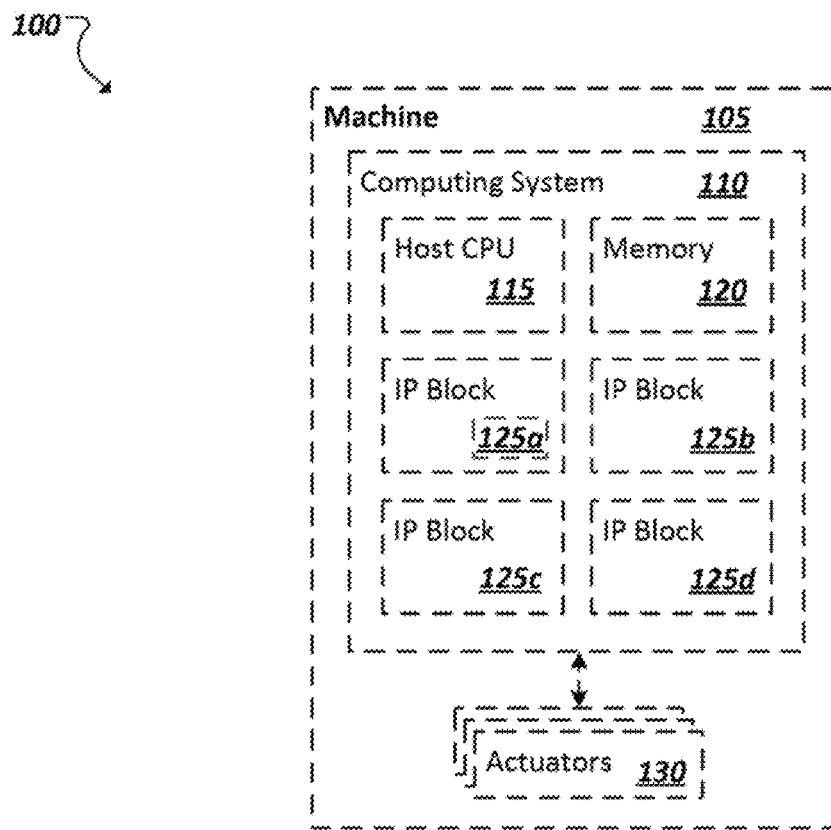
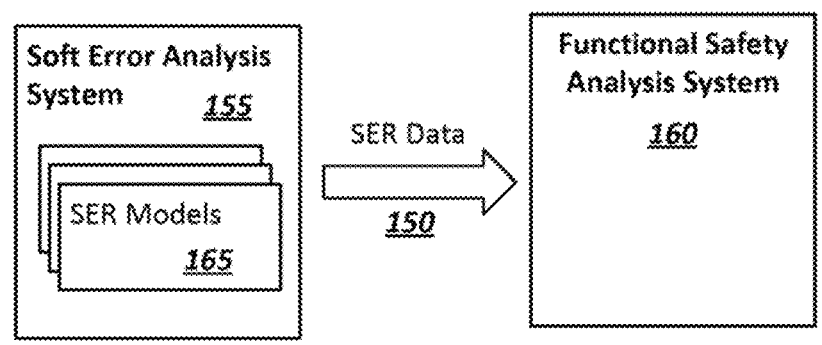
FIG. 1

US 11,144,027 B2

FUNCTIONAL SAFETY CONTROLS BASED ON SOFT ERROR INFORMATION

TECHNICAL FIELD

This disclosure relates in general to the field of computer systems and, more particularly, to determining and using soft error information related to hardware components of such computer systems.

BACKGROUND

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle. Such vehicles, and other autonomous machines, may be controlled and driven by sophisticated computing systems and underlying hardware, introducing new forms of security and functional concerns unique to computing systems.

BRIEF DESCRIPTION OF THE DRAWINGS

FIG. 1 is a simplified block diagram of an example machine including a computing system.

Like reference numbers and designations in the various drawings indicate like elements.

DETAILED DESCRIPTION OF EXAMPLE EMBODIMENTS

Figure 2:
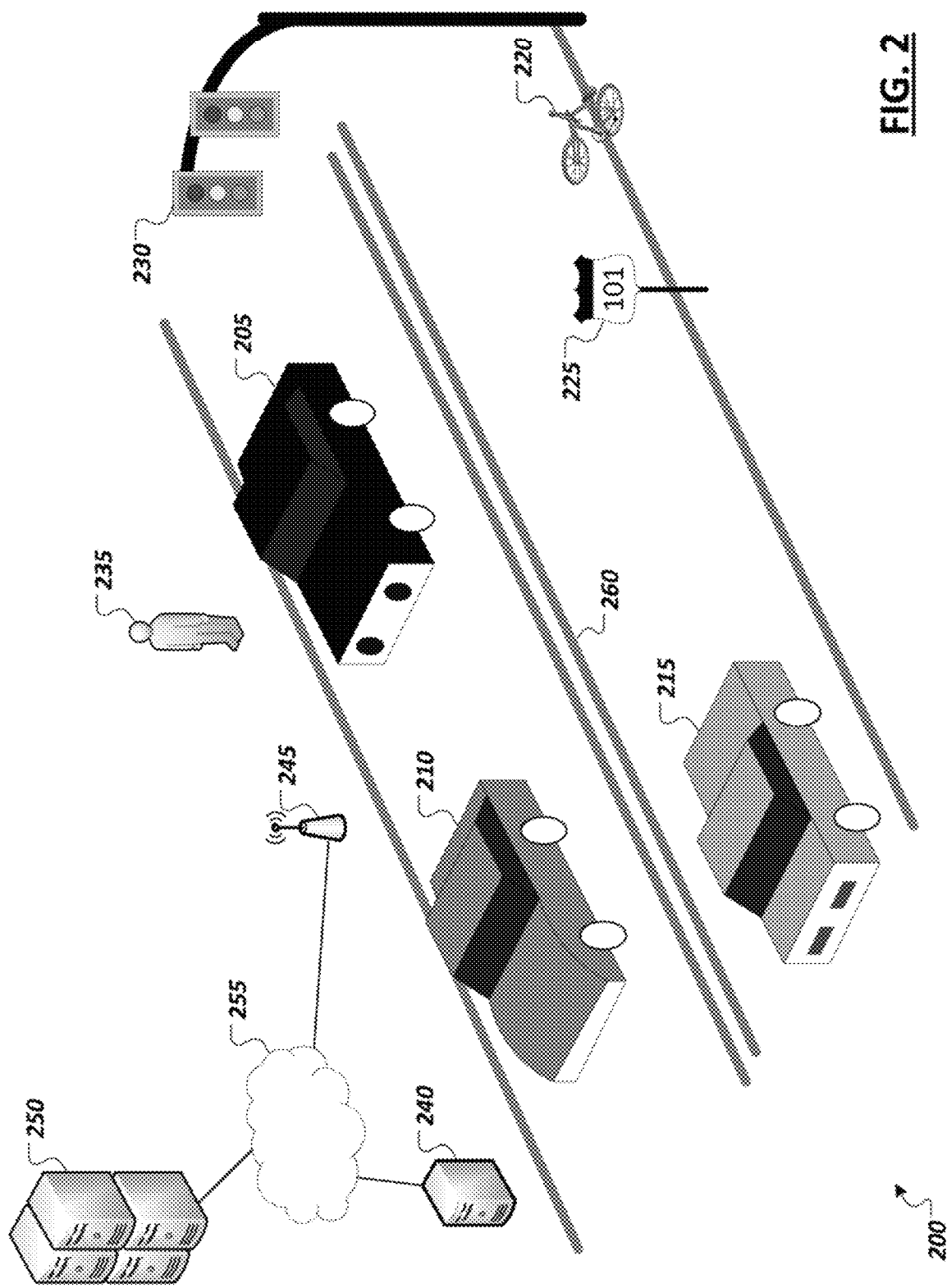
FIG. 2 is a simplified block diagram of an example autonomous driving environment.

FIG. 1 is a simplified block diagram 100 showing blocks of an example computing system, which may be implemented in a machine to facilitate the determination of functional safety metrics relating to the mechanical function(s) of the machine as controlled by one more computing blocks of the machine. For instance, an example machine 105 may be designed to include one or more computing systems (e.g., 110) equipped with a host processor (e.g., 115), one or more memory blocks (e.g., 120), and one or more additional computing, logic, and I/O blocks (e.g., intellectual property (IP) blocks 125a-d) interconnected through one or more interconnect fabrics, links, buses, or other interconnects. One or more of the blocks of the computing system may provide logic executable to generate data, which may be fed or otherwise provided to one or more actuators (e.g., 130) controlling at least some of the functions of the machine 105. For instance, the machine 105 may be a robot and physical movement of the robot may be based on the results of machine learning operations, computer vision, software operations performed using host processor 115, among other operations performed by the computing system 110. Similarly, an autonomous vehicle, such as an autonomous automobile, train, truck, or airplane, a drone, or other autonomous and semi-autonomous machines may similarly rely on the correct operation of underlying computing systems (e.g., 110) and their constituent computing blocks (e.g., 115, 120, 125a-d, etc.) in order function in a safe, reliable, and precise manner.

For many machines, various quality metrics, safety tests, and industry and governmental safety standards may apply given the potential safety risks inherent in the machine (or its underlying computing system(s)) operating incorrectly. For instance, the malfunction of heavy machinery, autonomous cars and trucks, surgical robots, and other machines may lead directly to catastrophic injury or death, if not expensive damage to property, inventory, or goodwill. Accordingly, ensuring safe operations of such machines may be an important concern. As computing systems (e.g., 110) are relied on ever increasingly to automate and enhance performance of machines, the complexity of safeguarding the safe and correct operation of the corresponding machines becomes increasingly important. Further, as such computing systems become more complex, sophisticated, and fast, safeguarding the accurate operation of these systems may become more challenging. Indeed, in one example, soft errors may occur in computing systems, which are errors in the value of datum or a signal generated by one or more components (or blocks) of the system, but which are not the result of a mistake or defect in the underlying component or system. For instance, a glitch, noise, electromagnetic interference, or particle radiation (or transient fault) may be the cause of a soft error. Such soft errors may occur despite the superior engineering of the underlying computing platform, but which, nonetheless, have the potential of resulting in system errors which ultimately may lead to a malfunction of machinery (e.g., controlled by actuators 130), which have the potential of introducing unacceptable safety risks or causing expensive damage.

As illustrated in the example of FIG. 1, in some implementations, design and implementation of an example computing system (e.g., 110) used to control a machine 105 may be enhanced through a combination of a soft error analysis system (e.g., 155) and functional safety analysis system (e.g., 160). In some implementations, the soft error analysis system (e.g., 155) and functional safety analysis system (e.g., 160) may be embodied within a single system or as separate system. In some implementations, functional safety analysis may involve determining functional safety metrics for each of the potentially multiple distinct blocks (e.g., 115, 120, 125a-d, 130, etc.) of a computing system and thereby determine an aggregate functional safety metric for the system 110. Further, based on the functional safety analysis performed for the composite blocks (e.g., 115, 120, 125a-d, 130, etc.) of a proposed computing system 110, opportunities to change or enhance the design individual blocks (e.g., which have disproportionately poor functional safety scores) may be identified through block-wise functional safety analysis. Engineering the individual blocks of the system 110 based on the results of the functional safety analysis may allow the system 110 to be designed to satisfy certain defined thresholds for the aggregate functional safety metrics of the system. For instance, in order to be eligible for use in controlling certain machines (e.g., 105) a computing system 110 may be required to meet certain functional safety requirements measured using the aggregate functional safety metrics, among other example implementations. Accordingly, some underperforming components of the computing system 110 may be replaced, or additional safeguards (e.g., error correction codes, particle shielding, failsafe modes, etc.) may be added to the design of the system to improve the functional safety attributes (and metrics) for the computing system 110, among other examples.

In some implementations, soft error data 150 may be generated by a soft error analysis system 155. Soft error data 150 may describe results of predictive modeling or simulations of individual components or electronic devices performed by a soft error analysis system 155 based on a variety of models considering such device-specific attributes as circuitry types, transistor sizes, node capacitance, VDD value, temperature, and other factors. Such models may include simulated device models and simulated alpha and neutron particle emission and simulating how these emissions affect the simulated device models. For instance, Simulation Program with Integrated Circuit Emphasis (SPICE)-based simulations, Monte Carlo modeling, and other models and techniques may be utilized to simulate various events, such as particle hits and soft error events and circuits' responses to such events, to estimate soft error failure rate and other metrics of the simulated components, among other aspects. In some implementations, soft error data may express the estimated failure rate induced by soft errors of a modeled component as a failure-in-time (FIT) or FIT/Mbit value, among other examples. In some implementations, such as discussed herein, an enhanced functional safety analysis system (e.g., 160) may operate directly on soft error data 150 to generate corresponding functional safety metric results for corresponding components (e.g., of a proposed computing system 110). Indeed, such implementations may enable more accurate and quicker functional safety analyses of a system (e.g., relating to transient fault metrics), among other example benefits.

As noted above, computing systems may be employed to automate operations of a diverse array of machines and machine types. Soft errors may potentially impact the safety of any such machine. FIG. 2 is a simplified illustration 200 showing an example autonomous driving environment including one or more such autonomous vehicles. Vehicles (e.g., 205, 210, 215, etc.) may be provided with varying levels of autonomous driving capabilities facilitated through in-vehicle computing systems with logic implemented in hardware, firmware, and/or software to enable respective autonomous driving stacks. Elements of such systems may be designed and implemented based on functional safety analyses performed by an improved functional system, such as described herein. Such autonomous driving stacks may allow vehicles to self-control or provide driver assistance to detect roadways, navigate from one point to another, detect other vehicles and road actors (e.g., pedestrians (e.g., 235), bicyclists, etc.), detect obstacles and hazards (e.g., 220), traffic guidance (e.g., road signs (e.g., 225), traffic signals (e.g., 230), traffic lanes 260), as well as road conditions (e.g., traffic, road conditions, weather conditions, etc.), and adjust control and guidance of the vehicle accordingly.

In some implementations, vehicles (e.g., 205, 210, 215) within the environment may be "connected" in that the in-vehicle computing systems include communication modules to support wireless communication using one or more technologies (e.g., IEEE 802.11 communications (e.g., WiFi), cellular data networks (e.g., 3rd Generation Partnership Project (3GPP) networks, Global System for Mobile Communication (GSM), general packet radio service, code division multiple access (CDMA), etc.), Bluetooth, millimeter wave (mmWave), ZigBee, Z-Wave, etc.), allowing the in-vehicle computing systems to connect to and communicate with other computing systems, such as the in-vehicle computing systems of other vehicles, roadside units, cloud-based computing systems, or other supporting infrastructure. For instance, in some implementations, vehicles (e.g., 205, 210, 215) may communicate with computing systems providing sensors, data, and services in support of the vehicles' own autonomous driving capabilities. For instance, as shown in the illustrative example of FIG. 2, supporting drones 280 (e.g., ground-based and/or aerial), roadside computing devices (e.g., 240), various external (to the vehicle, or "extraneous") sensor devices, and other devices may be provided as autonomous driving infrastructure separate from the computing systems, sensors, and logic implemented on the vehicles (e.g., 205, 210, 215) to support and improve autonomous driving results provided through the vehicles, among other examples. Vehicles may also communicate with other connected vehicles over wireless communication channels to share data and coordinate movement within an autonomous driving environment, among other example communications.

As illustrated in the example of FIG. 2, autonomous driving infrastructure may incorporate a variety of different systems. Such systems may vary depending on the location, with more developed roadways (e.g., roadways controlled by specific municipalities or toll authorities, roadways in urban areas, sections of roadways known to be problematic for autonomous vehicles, etc.) having a greater number or more advanced supporting infrastructure devices than other sections of roadway, etc. For instance, supplemental sensor devices may be provided, which include sensors for observing portions of roadways and vehicles moving within the environment and generating corresponding data describing or embodying the observations of the sensors. Sensor devices may also include communication capabilities to communicate their collected sensor data directly to nearby connected vehicles or to fog- or cloud-based computing systems (e.g., 240, 250). Vehicles may obtain sensor data collected by external sensor devices, or data embodying observations or recommendations generated by other systems (e.g., 240, 250) based on sensor data from these sensor devices, and use this data in sensor fusion, inference, path planning, and other tasks performed by the in-vehicle autonomous driving system.

As autonomous vehicle systems may possess varying levels of functionality and sophistication, support infrastructure may be called upon to supplement not only the sensing capabilities of some vehicles, but also the computer and machine learning functionality enabling autonomous driving functionality of some vehicles. For instance, compute resources and autonomous driving logic used to facilitate machine learning model training and use of such machine learning models may be provided on the in-vehicle computing systems entirely or partially on both the in-vehicle systems and some external systems (e.g., 240, 250). For instance, a connected vehicle may communicate with road-side units, edge systems, or cloud-based devices (e.g., 240 local to a particular segment of roadway, with such devices (e.g., 240) capable of providing data (e.g., sensor data aggregated from local sensors or data reported from sensors of other vehicles), performing computations (as a service) on data provided by a vehicle to supplement the capabilities native to the vehicle, and/or push information to passing or approaching vehicles (e.g., based on sensor data collected at the device 240 or from nearby sensor devices, etc.). A connected vehicle (e.g., 205, 210, 215) may also or instead communicate with cloud-based computing systems (e.g., 250), which may provide similar memory, sensing, and computational resources to enhance those available at the vehicle. For instance, a cloud-based system (e.g., 250) may collect sensor data from a variety of devices in one or more locations and utilize this data to build and/or train machine-learning models which may be used at the cloud-based system (to provide results to various vehicles (e.g., 205, 210, 215) in communication with the cloud-based system 250, or to push to vehicles for use by their in-vehicle systems, among other example implementations. Access points (e.g., 245), such as cell-phone towers, road-side units, network access points mounted to various roadway infrastructure, access points provided by neighboring vehicles or buildings, and other access points, may be provided within an environment and used to facilitate communication over one or more local or wide area networks (e.g., 255) between cloud-based systems (e.g., 250) and various vehicles (e.g., 205, 210, 215).

As an example autonomous vehicle (e.g., 205) may potentially dictate its operation and function based on inputs received from one or more computing systems providing such supporting infrastructure, such infrastructure computing systems (e.g., 240, 250) may also be implemented based on functional safety analyses performed using an improved functional safety analysis system, to protect against soft errors at these systems impacting the safety of one or more vehicles (e.g., 205, 210, 215, etc.) relying on the correct operation of these systems (e.g., 240, 250).

In general, "servers," "clients," "computing devices," "network elements," "hosts," "blocks," "platforms", "sensor devices," "edge device," "autonomous driving systems", "autonomous vehicles", "fog-based system", "cloud-based system", and "systems" generally, etc. discussed herein can include electronic computing devices operable to receive, transmit, process, store, or manage data and information associated with an autonomous driving environment. As used in this document, the term "computer," "processor," "processor device," or "processing device" is intended to encompass any suitable processing apparatus, including central processing units (CPUs), graphical processing units (GPUs), application specific integrated circuits (ASICs), field programmable gate arrays (FPGAs), digital signal processors (DSPs), tensor processors and other matrix arithmetic processors, among other examples. For example, elements shown as single devices within the environment may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Any of the flows, methods, processes (or portions thereof) or functionality of any of the various components described below or illustrated in the figures may be performed by any suitable computing logic, such as one or more modules, engines, blocks, units, models, systems, or other suitable computing logic. Reference herein to a "module", "engine", "block", "unit", "model", "system" or "logic" may refer to hardware, firmware, software and/or combinations of each to perform one or more functions. As an example, a module, engine, block, unit, model, system, or logic may include one or more hardware components, such as a micro-controller or processor, associated with a non-transitory medium to store code adapted to be executed by the micro-controller or processor. Therefore, reference to a module, engine, block, unit, model, system, or logic, in one embodiment, may refers to hardware, which is specifically configured to recognize and/or execute the code to be held on a non-transitory medium. Furthermore, in another embodiment, use of module, engine, block, unit, model, system, or logic refers to the non-transitory medium including the code, which is specifically adapted to be executed by the microcontroller or processor to perform predetermined operations. And as can be inferred, in yet another embodiment, a module, engine, block, unit, model, system, or logic may refer to the combination of the hardware and the non-transitory medium. In various embodiments, a module, engine, block, unit, model, system, or logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. A module, engine, block, unit, model, system, or logic may include one or more gates or other circuit components, which may be implemented by, e.g., transistors. In some embodiments, a module, engine, block, unit, model, system, or logic may be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Furthermore, logic boundaries that are illustrated as separate commonly vary and potentially overlap. For example, a first and second module (or multiple engines, blocks, units, models, systems, or logics) may share hardware, software, firmware, or a combination thereof, while potentially retaining some independent hardware, software, or firmware.

The flows, methods, and processes described below and in the accompanying figures are merely representative of functions that may be performed in particular embodiments. In other embodiments, additional functions may be performed in the flows, methods, and processes. Various embodiments of the present disclosure contemplate any suitable signaling mechanisms for accomplishing the functions described herein. Some of the functions illustrated herein may be repeated, combined, modified, or deleted within the flows, methods, and processes where appropriate. Additionally, functions may be performed in any suitable order within the flows, methods, and processes without departing from the scope of particular embodiments.

Figure 3:
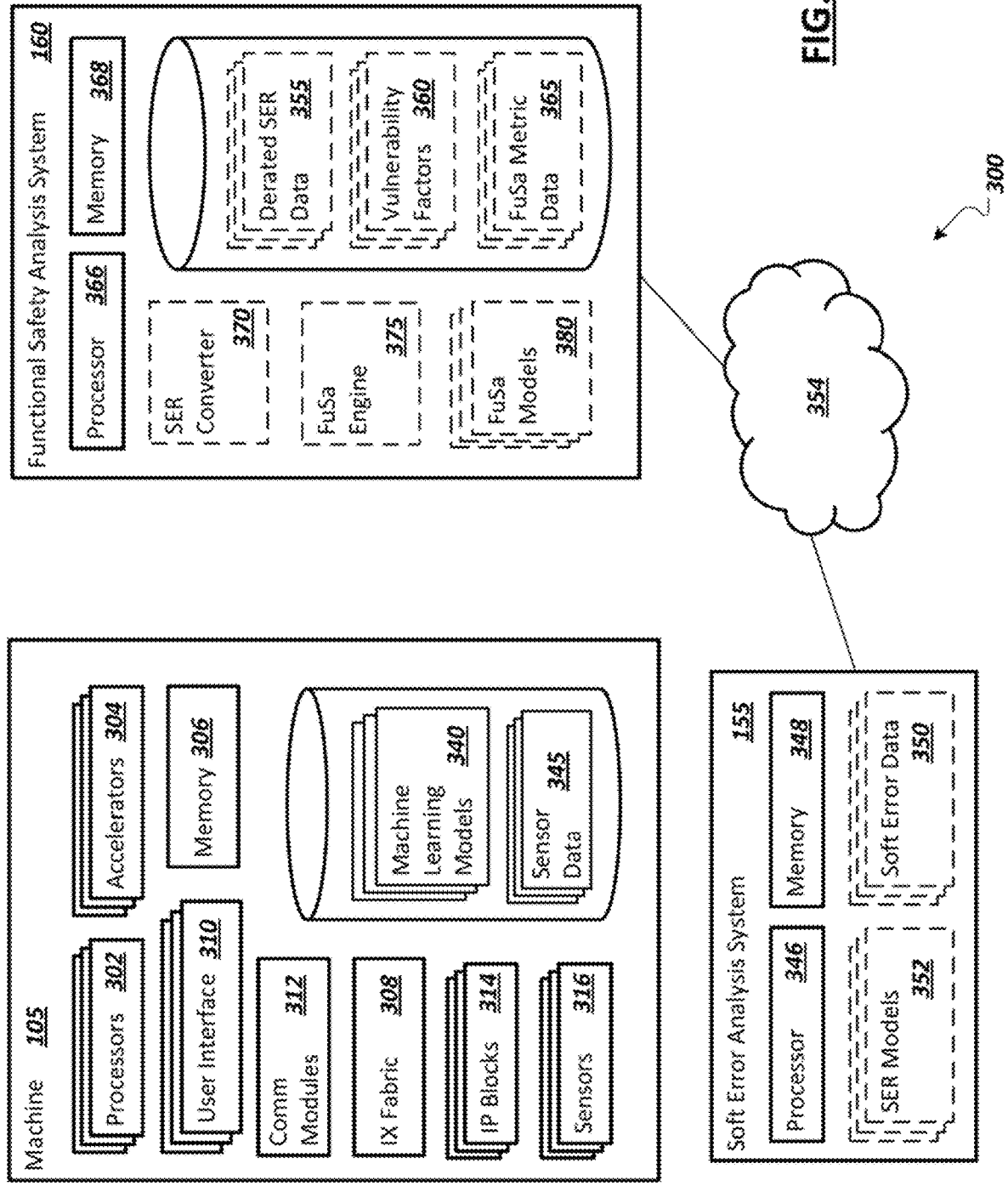
FIG. 3 is a simplified block diagram of an example machine including a functional safety analysis system.

With reference now to FIG. 3, a simplified block diagram 300 is shown illustrating an example implementation of a machine (e.g., 105) and corresponding computing system(s) equipped with logic (implemented in hardware and/or software) to automate at least a portion of the functionality of the machine 105. As discussed above, the development, approval, and implementation of such computing systems may include functional safety analyses to determine whether the computing system is fit for use in controlling the machine 105.

In the example of FIG. 3, the computing system(s) of the machine 105 may be implemented to include one or more processors 302, such as central processing units (CPUs), graphical processing units (GPUs), application specific integrated circuits (ASICs), field programmable gate arrays (FPGAs), digital signal processors (DSPs), tensor processors and other matrix arithmetic processors, among other examples. Such processors 302 may be coupled to or have integrated hardware accelerator devices (e.g., 304), which may be provided with hardware to accelerate certain processing and memory access functions, such as functions relating to machine learning inference or training (including any of the machine learning inference or training described below), processing of particular sensor data (e.g., camera image data, LIDAR point clouds, etc.), performing certain arithmetic functions pertaining to automating or directing the functionality of the machine 105, among other examples. One or more memory elements (e.g., 306) may be provided to store machine-executable instructions to implement logic to perform or control at least a portion of the functionality of the machine 105 and/or its computing system. Memory elements 306 may additionally or alternatively be used to store machine learning models (e.g., 340), sensor data (e.g., 345), and/or other data received, generated, or used by the machine and/or its computing system.

An example machine and computing system may additionally include various communication modules (e.g., 312), implemented in hardware circuitry and/or software, to implement communication capabilities used by the machine's system to communicate with other extraneous computing systems (e.g., 330) over one or more network channels employing one or more network communication technologies. These various processors 302, accelerators 304, memory devices 306, and network communication modules 312, may be interconnected in the machine's computing system through one or more point-to-point interconnect fabrics or links (e.g., 308), among other example technologies.

A computing system of an example machine 105 may be configured to generate, train, and/or use machine learning models (e.g., 340). For instance, machine learning models 340 may be utilized in connection with one or more autonomous functions and features provided and implemented at or for the machine 105. For instance, machine learning models 340 may be used to implement machine perception (e.g., to recognize the environment, objects, people, etc. around the machine and automatically adjust functions based on the physical environment), recognition), machine localization (e.g., to identify the location of the machine in an environment), machine path- or movement-planning (e.g., to determine a path to navigate, a free path to swing or move an arm or other machine element (e.g., of a robot), etc.), among other example uses. Machine learning models 340 may be used by the computing system to derive various inferences, predictions, classifications, and other results. Such machine learning models 340 may include artificial neural network models, convolutional neural networks, decision tree-based models, support vector machines (SVMs), Bayesian models, deep learning models, and other example models.

An example machine may further include one or more sensors 316, such as cameras (e.g., two-dimensional (2D) cameras, three-dimensional (3D) or stereo cameras, etc.), global positioning (GPS) sensors, light detection and ranging (LIDAR) sensors, acoustic sensors, inertial measurement unit (IMU) sensors, thermal sensors, ultrasound sensors, bio sensors (e.g., facial recognition, voice recognition, heart rate sensors, body temperature sensors, emotion detection sensors, etc.), radar sensors, weather or atmospheric sensors, among other example sensors. Corresponding sensor data (e.g., 345) may be generated by the respective sensors and used by the logic of the computing system (including artificial intelligence and machine learning models and operations) in connection with automating functionality of the machine 105. In some cases, sensor data 345 may additionally or alternatively include sensor data 345 generated by sensors external to the set of sensors (e.g., 316) on the machine 105 (e.g., to supplement or replace the machine's own sensors 316), among other example alternatives and features.

Soft errors may potentially impact the hardware of any of the components discussed in the example machine computing system above. Accordingly, a variety of functional safety analyses may be performed in connection with the implementation of the computing system (e.g., with individual functional safety analyses performed for each or several of the composite blocks implementing the computing system and used to determine aggregate functional safety metrics for the computing system(s)). In some implementations, one or more soft error analysis systems (e.g., 155) may be utilized to generate soft error rate (SER) data (e.g., 350) corresponding to a computing system and/or its various components. Corresponding soft error simulation models (e.g., 352), analysis tools, and other logic (e.g., executable by one or more processors (e.g., 346) and stored as code in one or more memory elements (e.g., 348)) may be provided on the soft error analysis system 155 to determine SER data estimating or predicting soft error failure rates and other information pertaining to the computing system's (proposed) components, functions, and architecture. As introduced above, an improved functional safety analysis system 160 may also be provided, which may utilize soft error data (e.g., generated by SER analysis tools of soft error analysis system 155 (and communicated to the functional safety analysis system 160 over one or more network connections (e.g., 354)) to generate improved functional safety metric data (e.g., 365) pertaining to transient faults.

In some implementations, soft error data 350 may categorize soft error rates based on soft error categories or classifications, such as detected correctable errors (DCE), detected uncorrectable errors (DUE), and silent data corruption (SDC), among other or additional categorizations. In other instances, such categorization of the soft error data 350 may be performed by an example functional safety (FuSa) analysis system 160, among other example implementations. An example FuSa analysis system 160 may include logic (e.g., implemented in executable code (stored in one or more memory elements (e.g., 368) and executable by one or more processor devices (e.g., 366)) to convert information and metrics in soft error data (e.g., 350) into parameters for use in determining improved functional safety metrics. For instance, an SER converter block 370 may be implemented, which may identify the computing system components for which particular SER data (e.g., 350) applies and identify corresponding vulnerability factors 360 (e.g., derived or provided by the FuSa analysis system 160 or another (e.g., external) system) and apply respective vulnerability factors 360 to corresponding subsets of the SER data (e.g., categorized SER data) to derate the SER data, generating derated SER data 355 (e.g., derated DCE SER data, derated DUE SER data, and derated SDC data) corresponding to each of the identified system components. In some implementations, an example FuSa analysis system 160 (e.g., using functional safety engine 375) may determine functional safety metrics (and corresponding FuSa metric data 365 describing these results) based on the derated SER data. Such functional safety metrics may include metrics defined according to a pre-defined standard, such as metrics defined within an international standard (e.g., IEC 61508, ISO 26262, etc.). In some implementations, FuSa metric data 365 generated from soft error data 350 may particularly relate to functional safety associated with transient faults. In some implementations, a functional safety analysis system 160 may include additional logic (e.g., implemented through functional safety models 380 and other logic) to also determine other functional safety metrics for other issues (e.g., not pertaining to transient faults), among other example functionality.

Figure 4:
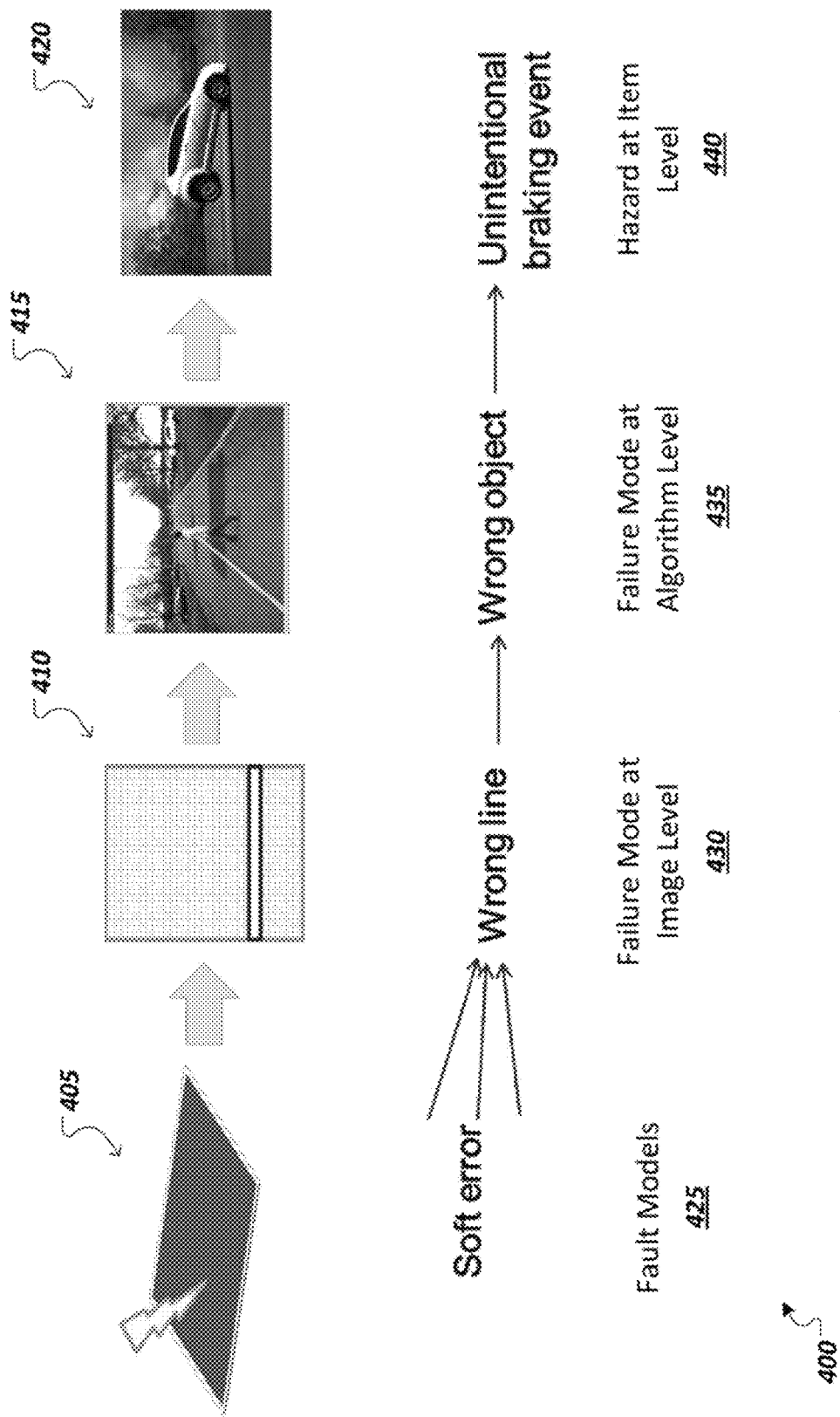
FIG. 4 is a block diagram illustrating an example malfunction of a machine caused by a soft error.

FIG. 4 is a block diagram illustrating machine malfunctions, which may result from soft errors in a corresponding computing system. For instance, in the particular illustration of FIG. 4, a computing system (e.g., a system-on-chip) may govern at least a portion of the autonomous driving functionality of an automobile. In the example illustrated in FIG. 4, a soft error 405 may occur, which results in datum or signals of a computing systems being corrupted. A soft error may occur when secondary particles hit the computing system hardware (e.g., chip, memory, etc.) and causes a change in state or value of data or a signal. For instance, soft errors may result from alpha particles emitted from integrated circuit package decay, cosmic ray (e.g., energetic neutrons or photons), thermal neutrons, neutron flux, random noise, signal integrity issues, capacitive crosstalk, and other causes. In some implementations, soft errors (e.g., 405) may be detected through simulation models (e.g., specific models corresponding to particular components (e.g., IP blocks) in a computing system) of a soft error analysis system (e.g., QISMAT, GEANT4, TIARA, Architecturally Correct Execution (ACE)-based systems, etc.). In the example of FIG. 4, the soft error 405 (e.g., an incorrect bit flip) results in an incorrect line (at 410) of an image being read in connection with an autonomous vehicle's computer vision system. The error at the image level may manifest at the image level 430. This error may further propagate by resulting in the computer vision algorithm, used by the machine's computing system, incorrectly detecting an object in sensor data provided to the system (e.g., as an input to a machine learning model), resulting in a failure mode at the algorithm level 435. Detection of the incorrect object 415 can thus result, in this example, in an unintentional (and incorrect) braking event 420 by the machine, resulting in a potential safety hazard at the machine item level 440. As should be appreciated, soft errors within autonomous machines may result in potentially catastrophic functional behaviors, as the machine is potentially driven incorrectly by the error in its computing system.

Figure 5:
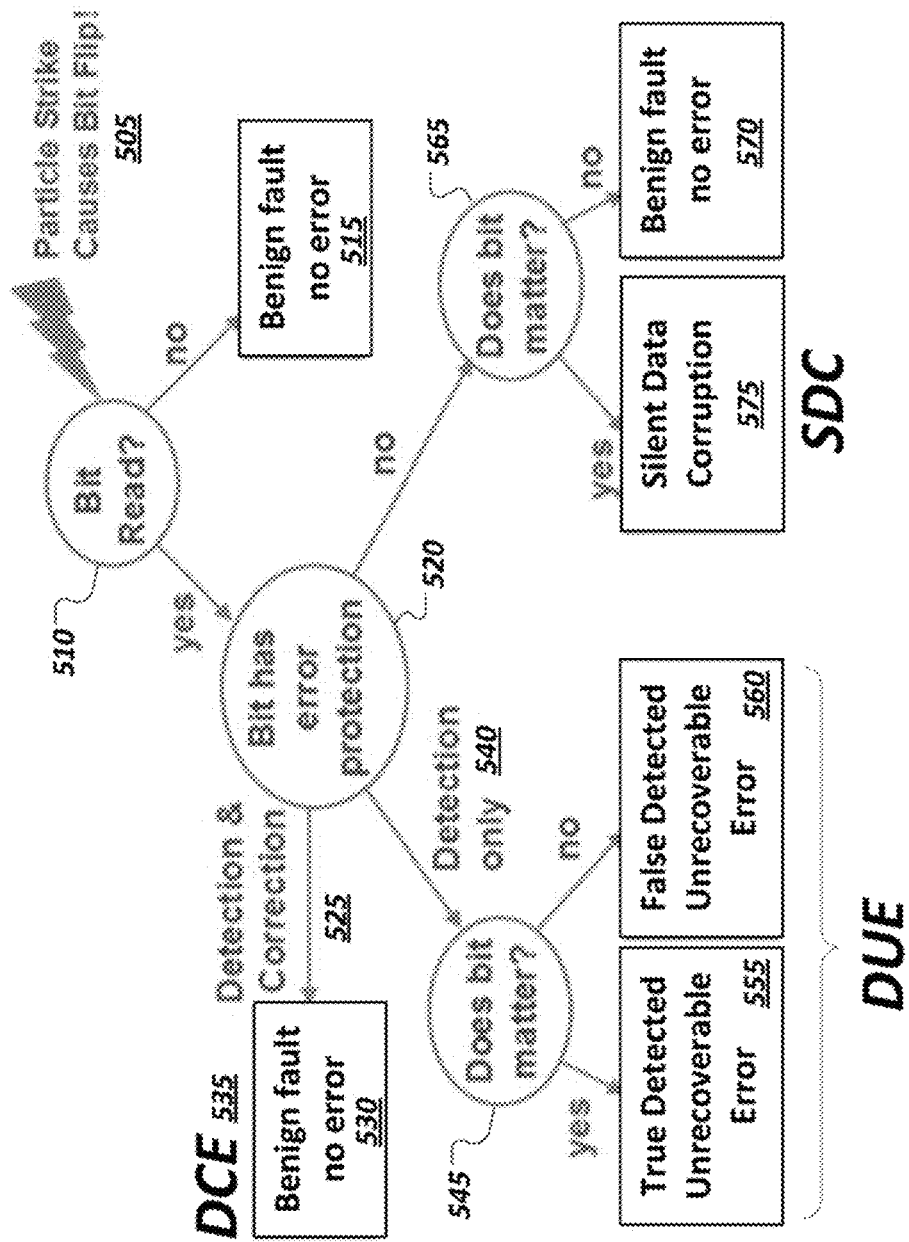
FIG. 5 is a flow diagram showing example categorization of soft errors.

FIG. 5 illustrates a flow diagram 500 showing an example categorization of soft errors by an example soft error analysis system (e.g., 155), functional safety analysis system (e.g., 160), or other computing system. For instance, soft error simulations may model instances where a particle strikes circuitry of a particular hardware computing device or block to cause a bit to flip (at 505) and a fault to occur. It can be determined whether the bit was read or not (at 510). If the bit was not read or otherwise used, the bit flip may be ignored, as the fault is considered "safe" 515. If the bit was read by another component (or software), it may be determined whether the bit has error protection or not (at 520), such as if the signal, packet, flit, or other data including the bit was protected by an error correction code, such as a cyclic redundancy check (CRC) value. In cases where the data including the faulty bit is protected in a manner that allows both detection and correction of the fault (at 525), the fault may be considered a safe fault 530 and may be categorized as a detectable correctable error (DCE) 535. If the error protection mechanism only allows for detection (i.e., and not correction) of the fault (at 540), the error may be categorized as a detectable uncorrectable error (DUE) 550. Further, in cases of a DUE, the bit may be analyzed (at 545) to determine whether the fault has the potential to cause a substantive issue in the computing system. If the bit is of substantive importance, it may be further classified as a true detected unrecoverable error 555 (e.g., an error involving an element being used in a process of interest), otherwise it may be classified as a false detected unrecoverable error 560 (e.g., an error involving an element being used in a process of interest).

Continuing with the example of FIG. 5, if it is determined that the faulty bit was both read (at 510) and does not have error protection applied to it (at 520), it may be analyzed to determine whether the erroneous bit affects substantive data (at 565). If it is determined that the affected bit does not matter, the error may be treated as a safe fault 570 and may be ignored. However, if the error affected a substantive bit, the error may be categorized as silent data corruption (SDC) 575, which may be regarded as the most severe or troublesome category of transient errors in the system (e.g., by virtue of these errors being both substantive and undetected and thus uncorrected).

Based on the number, or rate, of transient soft errors, as well as the categorization of these soft errors and soft error rates, such as discussed in the example of FIG. 5, functional safety metrics and corrective actions may be determined. For instance, a nominal soft error rate (SER) may be determined for each of a number of categories of soft errors (e.g., DCE, DUE, SDC, etc.). In some cases, these nominal failure in time (FIT) values may be derated using one or more vulnerability factor values. Vulnerability factors may be specific to the hardware-component associated with the SER and the resulting derated SER values may likewise be hardware component (e.g., IP block) specific. In some instances, the vulnerability factors may include one or a combination of an architecture vulnerability factor (AVF), a timing vulnerability factor (TVF), and program vulnerability factor (PVF). Vulnerability factors may identify or estimate the probability that a given soft error will actually result in a failure based on the particular attributes of the affected component or system (e.g., the probability that the error will be able to propagate and eventually impact a latch holding a machine state, workload, etc.). For instance, architecture vulnerability factors (AVFs) may correspond to the respective microarchitecture and workload of a given component and may pertain to affects to the hardware logic of the component, its microarchitectural structure, sequential states, static logic, and so on. Timing vulnerability factors (TVFs) may be function of clocking, circuit behavior, and workload and may pertain primarily to effects on the sequential state. Program vulnerability factors (PVFs) may be a function of the final user-observable program output or how related firmware- or software-based programs use data, with PVF reflecting the probability that an error will impact the program's result (e.g., at the system level), among other examples. Vulnerability factors may be pre-derived through intensive simulation modeling and testing of the corresponding components.

In some implementations, an improved functional safety analysis system may use derated SER values automatically and autonomously derive functional safety values, which may be used to determine whether a component or system is in compliance with standard-, industry-, government-, manufacturer-, or otherwise provided safety thresholds. Determining a failure by an individual component, a grouping of components, or the system as a whole (e.g., based on an aggregate FuSa metric derived from the combined, component-wise FuSa values derived for the individual components) may then be used to promote the adoption of design changes in the system or the enabling (e.g., automatic enabling) of certain corrective or preventative features on the computing system (e.g., even if enabling the features involves a trade-off in overall system performance) to address problematic components of the system and bring the system into compliance with functional safety standards (e.g., which may be verified through a follow-up soft error and/or functional safety analysis of the system with the corrective measures employed).

As described herein, performing functional safety analysis and basing corrective measures and design changes on such analysis may include utilizing several inputs from design, architecture, and technology of the underlying system and include the raw FIT/bit measurement, bit counts for each block as well as additional safety metrics, such as safety metrics defined under a related standard, such as ISO 26262, IEC 61508, among others. For instance, in the case of systems governed by ISO 26262, functional safety metrics may include such values as $F_{safe}$, lambda values, and residual fault coverage ($K_{RF}$) values, among other examples. A functional safety analysis system may autonomously determine metrics to identify whether a machine and its system in compliance with related safety standards, such as a Safety Integrity Level (SIL) (defined in IEC 61508), an Automotive Safety Integrity Level (ASIL) (defined in ISO 26262), or another standard, based on the results of a related functional safety analysis using these (and similar) functional safety metrics.

Figure 6:
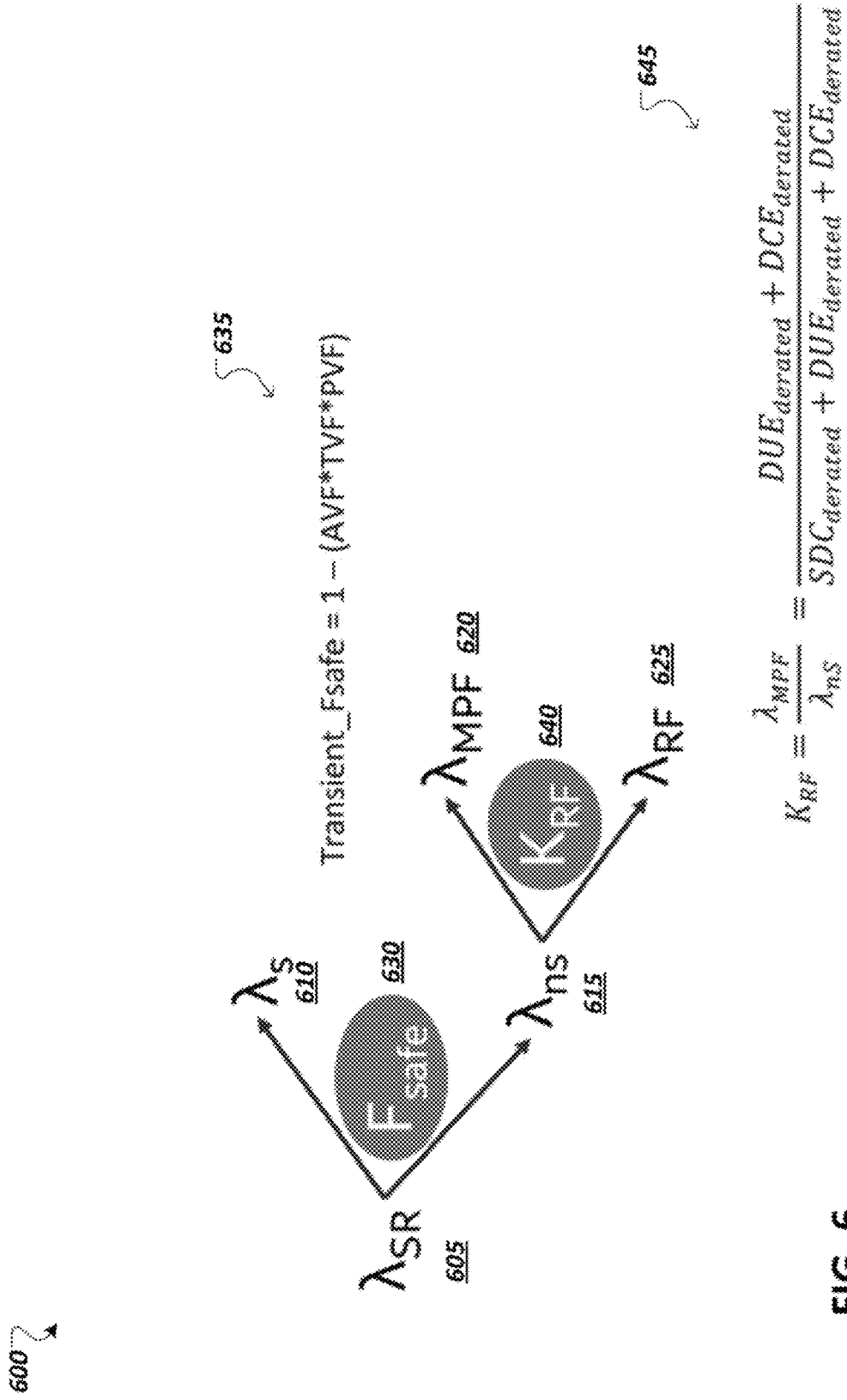
FIG. 6 is a diagram representing example functional safety metrics and algorithms.

Turning to FIG. 6, a diagram 600 is shown illustrating example functional safety metrics and algorithms, which may be utilized to derive such functional safety metrics from soft error data and/or vulnerability factors. For instance, in the example of FIG. 6, various functional safety metrics may be defined (e.g., according to ISO 26262), such as lambda ($\lambda$) values representing functional failure rates (e.g., FIT values). For instance, $\lambda_{SR}$ 605 may represent the safety-related FIT. $\lambda_{SR}$ 605 may be split into safe and unsafe errors, where $\lambda_S$ 610 is the safe FIT and $\lambda_{NS}$ 615 is the not safe FIT. Safe and not-safe errors may be distinguished based on whether those errors lack physical connection or are masked by some logic along the way such that the errors cannot reach safety critical logic of the machine. As unsafe safety-related functional safety errors may be of the most interest, $\lambda_{NS}$ may be split into measure of multi-point failures and residual fault errors, where $\lambda_{MPF}$ 620 represents multi-point fault FIT (e.g., where the individual faults do not violate the system, but could potentially, in aggregate, violate the system) and $\lambda_{RF}$ 625 represent the residual fault FIT (e.g., where residual faults represent the amount of dangerous faults for the system (or faults, that by themselves lead to a violation of a safety goal and occur on hardware elements not covered by appropriate safety mechanisms to mitigate against the fault)). In some implementations, other safety metrics may be used during functional safety analysis, such as $F_{safe}$ 630, which articulates the ratio or percentage of safety-related functional safety issues which are (or are not) not-safe, and $K_{RF}$ 640, which may similarly articulate the ratio or percentage of unsafe errors which are or are not residual faults, among other examples.

In one example, an $F_{safe}$ value 630 may be determined for transient fault-related errors from soft error data, such as vulnerability factors utilized in derating of soft error data. For instance, a transient $F_{safe}$ value 630 may be determined according to a formula 635:

Transient_Fsafe=1−(AVF*TVF*PVF)

where AVF is the architecture vulnerability factor, TVF is the timing vulnerability factor, and PVF is the program vulnerability factor of a corresponding component.

In another example, an individual lambda value defined under a FuSa standard may be derived from derated SER value determined at a computing system of a machine. For instance, The SER data can be matched with the safety parameters as follows:

$\lambda_{SR}$=SDC$_{underated}$+DUE$_{underated}$+DCE$_{underated}$ $\lambda_{NS}$=SDC$_{derated}$+DUE$_{derated}$+DCE$_{derated}$ $\lambda_{RF}$=SDC$_{derated}$ $\lambda_{MPF}$=DUE$_{derated}$+DCE$_{derated}$ where SDC$_{underated}$ is the underated (e.g., nominal) value of SDC errors determined for a component, DUE$_{underated}$ is the underated (e.g., nominal) value of DUE errors determined for a component, DCE$_{underated}$ is the underated (e.g., nominal) value of DCE errors determined for a component, SDC$_{derated}$ is the derated value of SDC errors determined for a component, DUE$_{derated}$ is the derated value of DUE errors determined for a component, DCE$_{derated}$ is the derated value of DCE errors determined for a component. Using these lambda values (as illustrated at 645), the relative $K_{RF}$ metric may be determined according to the formula:

$$K_{RF} = \frac{\lambda_{MPF}}{\lambda_{NS}} = \frac{DUE_{derated} + DCE_{derated}}{SDC_{derated} + DUE_{derated} + DCE_{derated}}$$

Such as illustrated in the example of FIG. 6 (and the related description), raw SER data can be transformed into various functional safety metrics designated as inputs for safety analysis. By mapping the SER parameters to the specific inputs needed for safety analysis, an automation can thereby be enabled to be performed at a functional safety analysis system, directly exporting the output of a SER analysis for use as an input for functional safety analysis. Such improved functional safety analysis systems enable not only automation of this analysis, but also provide greatly streamlined and expedited analysis at substantially increased accuracy.

Figure 7:
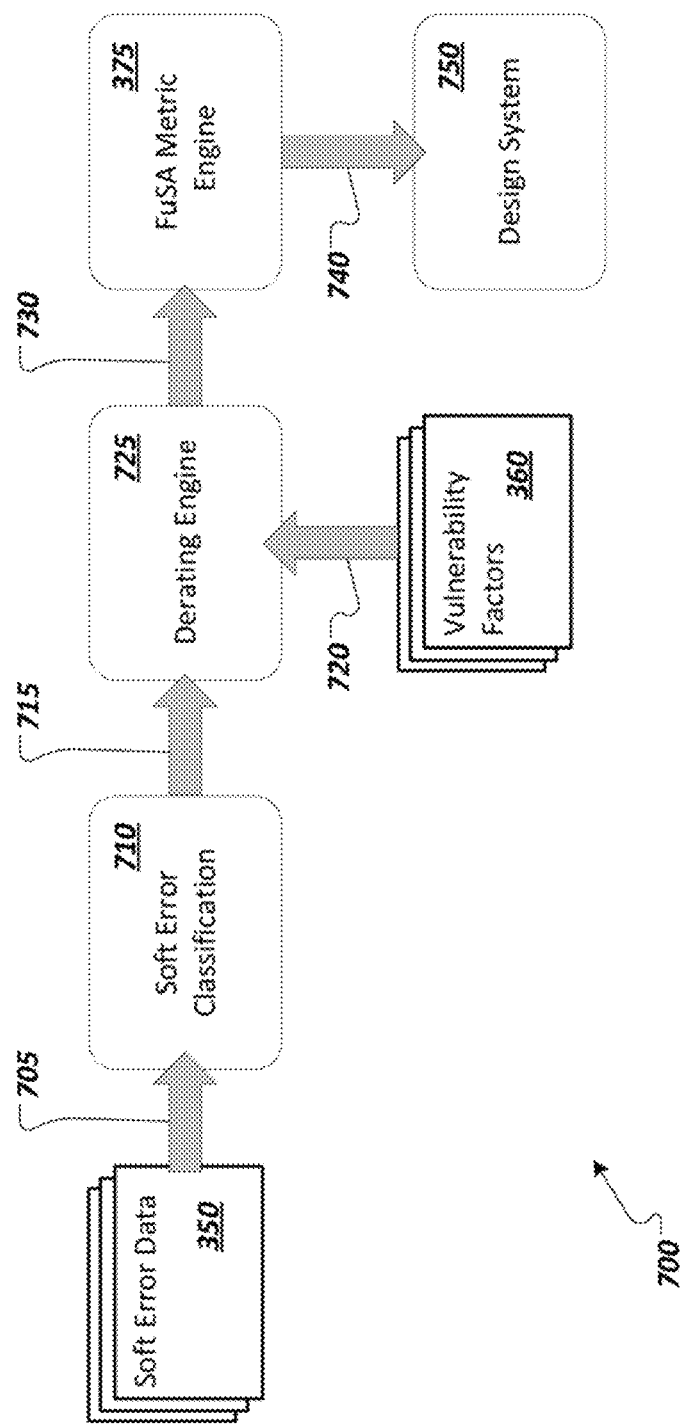
FIG. 7 is a simplified block diagram illustrating an example for automating functional safety analysis and actions based on soft error data.

Turning to the simplified block diagram 700 of FIG. 7, an example flow is illustrated of a functional safety analysis based on SER data generated by SER tools evaluating a computing system of an example machine (e.g., an autonomous vehicle, drone, robot, industrial machine, etc.). For instance, as introduced herein, soft error data 350 may be generated by soft error detection tools and logic to model soft error failure rates of individual components of the computing system (e.g., individual IP blocks). In some instances, the soft error data 350 may be expressed as individual soft errors or as soft error rate (SER) (e.g., with SER data capable of being derived by the system from data describing individual soft errors). The soft error data 350 may be provided (at 705) to soft error classification or categorization logic 710 (e.g., of a functional safety analysis system) to categorize the reported soft errors according to one of a set of categories (e.g., DCE, DUE, SDC, etc.). The soft error classification logic block 710 may generate data 715 representing the results of categorization so as to enumerate which soft errors belong to which category, and may provide this data 715 as an input to a derating engine 725 (e.g., of the functional safety analysis system or soft error analysis system). The derating engine 725 may additionally find and access vulnerability factor data 360 corresponding to the system component for which the categorized soft error data 715 is provided, and derive derated soft error data for each of the categories (e.g., $SDC_{derated}$, $DUE_{derated}$, $DCE_{derated}$, etc.). The derated, categorized soft error data (e.g., 730) may then be provided to a functional safety metric engine 375 (e.g., of a functional safety analysis system) to derive one or more functional safety metrics 740 (e.g., defined under one or more industrial standards). Such functional safety metrics may include examples, such as a $K_{RF}$ value, a $\lambda_{RF}$ value, $F_{safe}$ value, or other value. Functional safety metrics 740 generated from the soft error data may be provided, for instance, to a design system (e.g., 750) or another tool for use in modifying, designing, or otherwise implementing the corresponding computing system. For instance, a design system 750 may be utilized to generate or edit data (e.g., hardware description language, CAD, or other data) used to define attributes, layout, components, or architecture of the considered computing system, among other examples. Functional safety metrics 740 may be used, along with other information, to assist in the definition of computing system components and attributes so to realize a system compliant with certain functional safety thresholds, among other example applications. For instance, if it is found, through the functional safety metrics, that one or more components of the system would jeopardize the functional safety of the system, a design system 750, or other tool, may be used to define one or more corrective, preventative, or functional changes to mitigate against functional risks introduced through soft errors, as identified in the functional safety metrics 740, among other examples.

As some FuSa values (and the underlying SER values from which they may be derived) are component-specific, one or more components of an example functional safety analysis system (e.g., FuSa metric engine 735)) may additionally compute one or more aggregated FuSa metric values. As an example, a system integrity threshold value (e.g., an Automotive Safety Integrity Level (ASIL) value) may set an aggregate functional FIT (or lambda) value for the machine's computing system. Accordingly, the functional safety analysis system may collect functional safety values for a collection of components of the machine's computing system and derive a collective or aggregate functional safety value from these component values for a portion (e.g., a subsystem) or the entire computing system, and utilize this aggregate FuSa value in determining whether (and/or which) corrective actions to take in the design of the subject system, among other examples.

Figure 8:
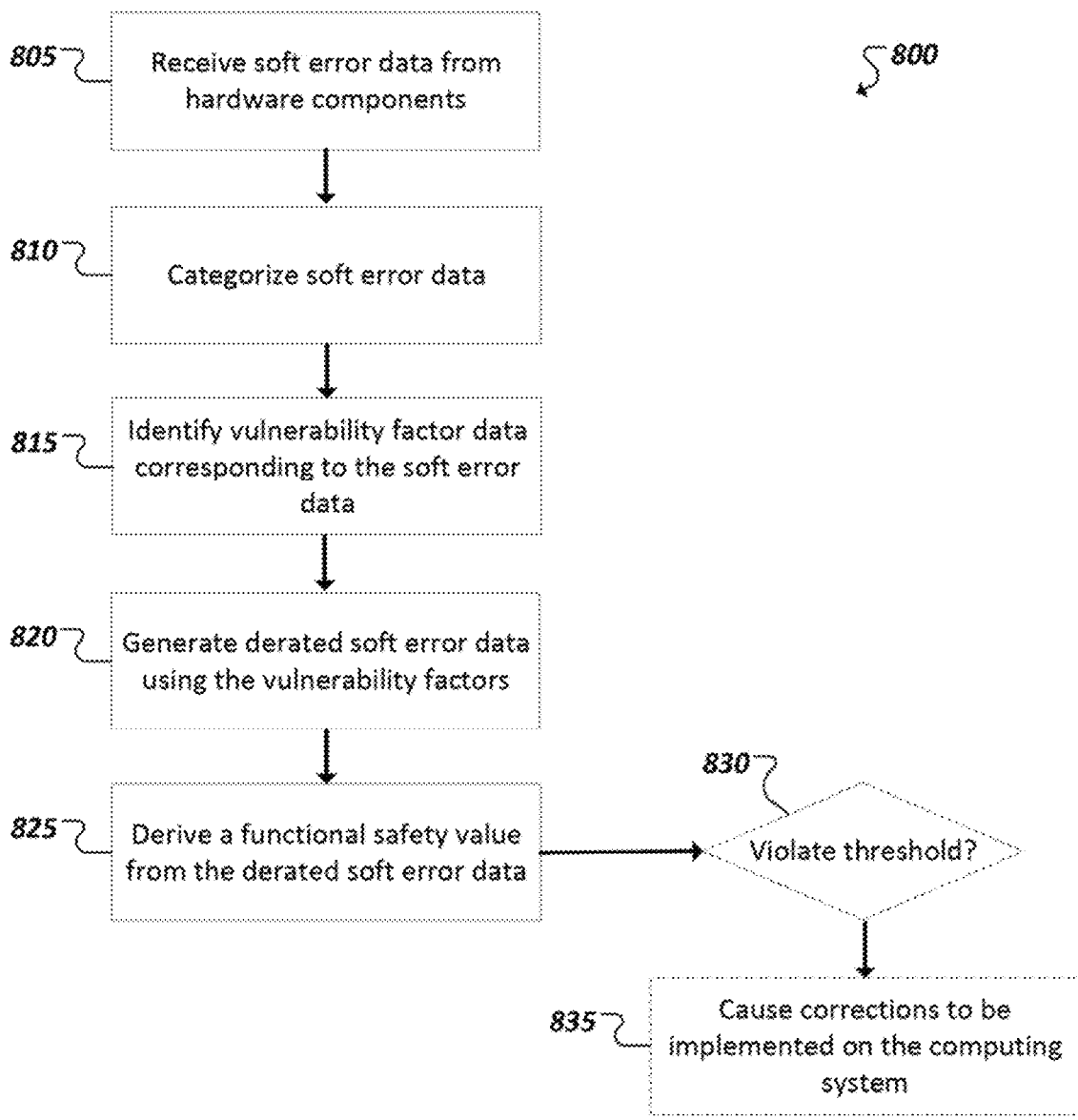
FIG. 8 is a simplified flow diagram illustrating an example technique for performing functional safety tasks at a machine based on soft errors identified on a computing system of the machine.

FIG. 8 is a flowchart 800 illustrating an example technique for performing a functional safety analysis of a computing system to control at least a portion of an example machine. For instance, soft error data may be generated by SER tools, which may be provided to a functional safety analysis system or another computer-implemented tool, among other examples. The soft errors described in the soft error data may be categorized 810, or "classified", according to a set of soft error categories, such as masked errors, discoverable correctable errors, discoverable uncorrectable errors, and silent data corruption, among other examples. Vulnerability factors may be identified 815, which correspond to respective soft error data and may be used to derate the soft errors described to generate 820 derated soft error data. One or more functional safety metric values may be derived 825 from the derated (and categorized) soft error data, such as functional safety metric values defined according to an industrial standard or as another metric traditionally used in functional safety analytics. The derived functional safety metric value(s) may be utilized to determine whether the computing system of the example machine is in compliance with one or more thresholds or standards (e.g., at 830), and may be further used to determine changes to the computing system, such as the substitution of components in the system, activation or implementation of various safety measures (at 835) (e.g., error detection and/or correction features or protocols) to bring the computing system into compliance with functional safety thresholds, among other example uses.

Figure 9:
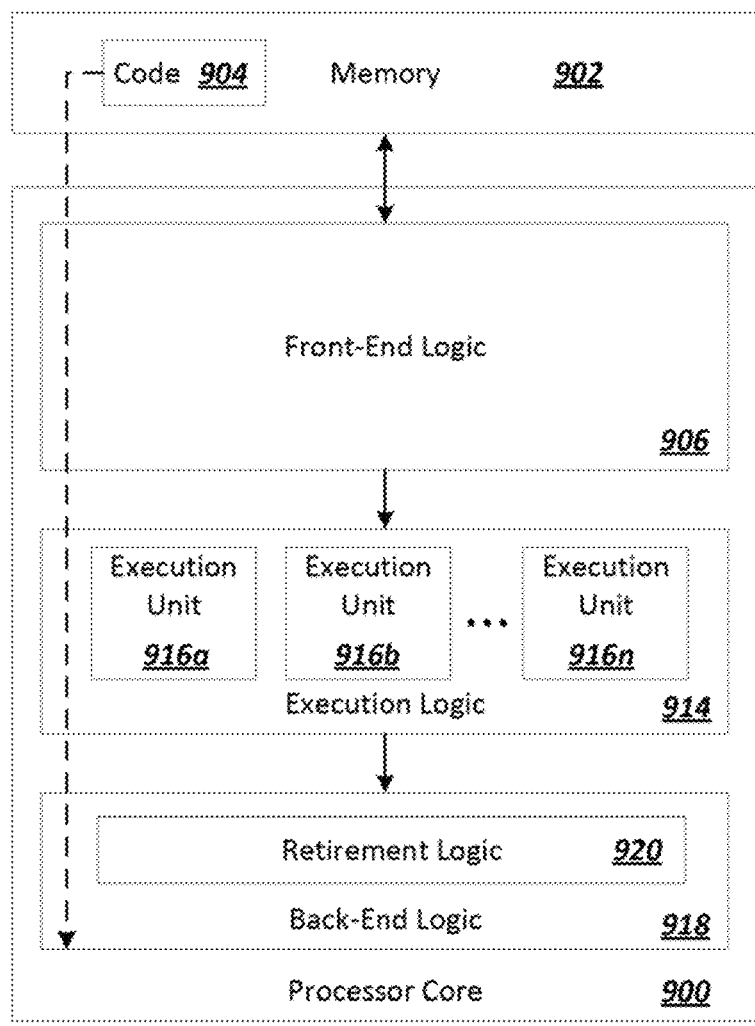
FIG. 9 is a block diagram of an exemplary processor in accordance with one embodiment.
Figure 10:
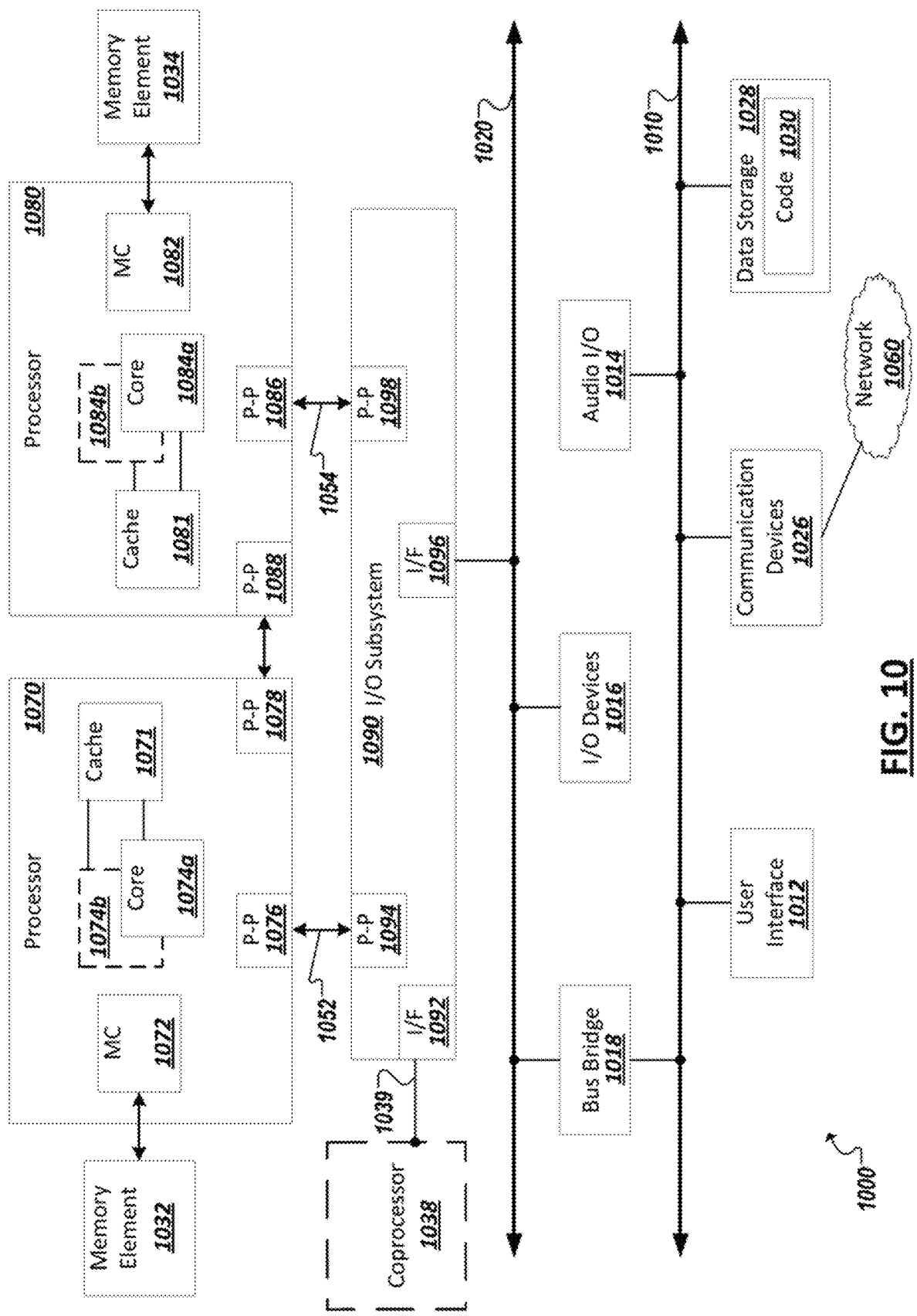
FIG. 10 is a block diagram of an exemplary computing system in accordance with one embodiment.

FIGS. 9-10 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 9-10.

FIG. 9 is an example illustration of a processor according to an embodiment. Processor 900 is an example of a type of hardware device that can be used in connection with the implementations above. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 900.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a co-processor 1038, such as a high-performance graphics circuit, machine learning accelerator, or other co-processor 1038, via an interface 1039, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a user interface 1012 (such as a keyboard, mouse, touchscreen, or other input devices), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is machine-readable storage medium with instructions stored thereon, where the instructions are executable by a machine to cause the machine to: access soft error data to describe soft errors predicted to affect at least a particular hardware component of a computing system, where the computing system is to control at least a portion of physical functions of a machine using the particular hardware component; determine respective soft error rates for each of a set of classifications based on the soft errors described in the soft error data; perform derating of the soft error rates based on a set of one or more vulnerability factors to generate derated error rate values for each of the set of classifications; determine a functional safety value from the derated error rate values; and determine whether a functional safety threshold is violated based on the functional safety value.

Example 2 includes the subject matter of example 1, where the set of vulnerability factors include an architecture vulnerability factor (AVF), a time vulnerability factor (TVF), and a program vulnerability factor (PVF).

Example 3 includes the subject matter of any one of examples 1-2, where the set of classifications include detectable correctable errors (DCE), detectable uncorrectable errors (DUE), and silent data corruption (SDC).

Example 4 includes the subject matter of example 3, where the functional safety value includes a residual fault rate value for at least a particular one of the one or more hardware components.

Example 5 includes the subject matter of example 4, where the residual fault rate value is based on a derated error rate value determined for SDC errors of the particular hardware component.

Example 6 includes the subject matter of any one of examples 1-5, where the instructions are further executable to cause the machine to determine an aggregate functional safety value for the computing system from a respective functional safety value determined for each one of a plurality of components of the computing system, where the plurality of components comprise the particular hardware component.

Example 7 includes the subject matter of example 6, where the functional safety threshold comprises a threshold value of the aggregate functional safety value.

Example 8 includes the subject matter of any one of examples 1-7, where the functional safety value comprises a residual fault coverage value ($K_{RF}$).

Example 9 includes the subject matter of any one of examples 1-8, where the functional safety value comprises a set of lambda values.

Example 10 includes the subject matter of any one of examples 1-9, where the functional safety metric is defined by an industrial standard.

Example 11 includes the subject matter of example 10, where the industrial standard includes one of ISO 26262 or IEC 61508.

Example 12 includes the subject matter of any one of examples 1-11, further including a system-on-chip (SOC) device, where the one or more computing logic blocks include intellectual property (IP) blocks of the SOC device.

Example 13 includes the subject matter of any one of examples 1-12, where determination of the functional safety value occurs in substantially real-time.

Example 14 includes the subject matter of any one of examples 1-13, where the machine includes an at least partially autonomous passenger vehicle, and the physical functions include one or more of steering, accelerating, or braking the vehicle.

Example 15 includes the subject matter of any one of examples 1-13, where the machine includes a robot.

Example 16 includes the subject matter of example 15, where the robot includes an industrial robot.

Example 17 includes the subject matter of any one of examples 1-13, where the machine includes an at least partially autonomous drone, and the physical functions include one or more of steering, accelerating, or braking the drone.

Example 18 includes the subject matter of any one of examples 1-17, where: the one or more vulnerability factors include an architecture vulnerability factor (AVF), a time vulnerability factor (TVF), and a program vulnerability factor (PVF); the set of classifications include detectable correctable errors (DCE), detectable uncorrectable errors (DUE), and silent data corruption (SDC); and the functional safety value includes a residual fault rate value for at least a particular one of the one or more hardware components.

Example 19 is a method including: receiving soft error rate data, where the soft error rate data describe one or more soft errors at one or more hardware components of a machine, and the one or more hardware components include logic to control at least a portion of physical functions of the machine; determining a respective classification of each of the one or more soft errors described in the soft error rate data, where the classification is one of a set of classifications; identifying one or more vulnerability factors corresponding to the one or more hardware components; performing derating of the soft error rate data using the one or more vulnerability factors to generate derated error rate values for each of the set of classifications; determining a functional safety value from the derated error rate values; and determining whether the functional safety value is greater than or equal to a threshold value.

Example 20 includes the subject matter of example 19, where the set of vulnerability factors include an architecture vulnerability factor (AVF), a time vulnerability factor (TVF), and a program vulnerability factor (PVF).

Example 21 includes the subject matter of any one of examples 19-20, where the set of classifications include detectable correctable errors (DCE), detectable uncorrectable errors (DUE), and silent data corruption (SDC).

Example 22 includes the subject matter of example 21, where: the one or more vulnerability factors include an architecture vulnerability factor (AVF), a time vulnerability factor (TVF), and a program vulnerability factor (PVF); and the functional safety value includes a residual fault rate value for at least a particular one of the one or more hardware components.

Example 23 includes the subject matter of example 22, where the functional safety value includes a residual fault rate value for at least a particular one of the one or more hardware components.

Example 24 includes the subject matter of example 23, where the residual fault rate value is based on a derated error rate value determined for SDC errors of the particular hardware component.

Example 25 includes the subject matter of any one of examples 19-24, where the functional safety metric is defined by an industrial standard.

Example 26 includes the subject matter of example 25, where the industrial standard includes one of ISO 26262 or IEC 61508.

Example 27 includes the subject matter of any one of examples 19-26, further including a system-on-chip (SOC) device, where the one or more computing logic blocks include intellectual property (IP) blocks of the SOC device.

Example 28 includes the subject matter of any one of examples 19-27, where the machine includes an at least partially autonomous passenger vehicle, and the physical functions include one or more of steering, accelerating, or braking the vehicle.

Example 29 includes the subject matter of any one of examples 19-28, where the machine includes a robot.

Example 30 includes the subject matter of example 29, where the robot includes an industrial robot.

Example 31 includes the subject matter of any one of examples 19-30, where the machine includes an at least partially autonomous drone, and the physical functions include one or more of steering, accelerating, or braking the drone.

Example 32 includes the subject matter of any one of examples 19-31, where the one or more vulnerability factors include an architecture vulnerability factor (AVF), a time vulnerability factor (TVF), and a program vulnerability factor (PVF); the set of classifications include detectable correctable errors (DCE), detectable uncorrectable errors (DUE), and silent data corruption (SDC); and the functional safety value includes a residual fault rate value for at least a particular one of the one or more hardware components.

Example 33 includes the subject matter of example 32, where the functional safety value includes a residual fault coverage value ($K_{RF}$) determined according to the formula:

$$K_{RF} = \frac{DUE_{derated} + DCE_{derated}}{SDC_{derated} + DUE_{derated} + DCE_{derated}},$$

where $DUE_{derated}$ includes a derated DUE rate value, $DCE_{derated}$ includes a derated DCE rate value, and $SDC_{derated}$ includes a derated SDC rate value.

Example 33 includes the subject matter of example 32, where the functional safety value includes a set of lambda values determined according to the formulas: $\lambda_{NS}=SDC_{derated}+DUE_{derated}+DCE_{derated}$; $\lambda_{RF}=SDC_{derated}$; $\lambda_{MPF}=DUE_{derated}+DCE_{derated}$; where $\lambda_{NS}$ includes a not-safe failure in time (FIT) value, $\lambda_{RF}$ includes a residual fault FIT value, and $\lambda_{MPF}$ includes a multi-point fault FIT value, and where $DUE_{derated}$ includes a derated DUE rate value, $DCE_{derated}$ includes a derated DCE rate value, and $SDC_{derated}$ includes a derated SDC rate value.

Example 34 includes the subject matter of any one of examples 19-33, further including generating the soft error rate data.

Example 35 includes the subject matter of example 34, further including performing simulations on one or more models of the one or more hardware components to generate the soft error rate data.

Example 36 is a system including means to perform the method of any one of examples 19-35.

Example 37 includes the subject matter of example 36, where the means include a computer-readable storage medium with instructions stored thereon, where the instructions, when executed by a data processing apparatus, cause the data processing apparatus to perform all or a portion of the method of any one of examples 19-35.

Example 38 includes the subject matter of example 36, where the means include hardware circuitry.

Example 39 includes the subject matter of example 36, where the means include firmware.

Example 40 is a system including: one or more processors; one or more computing logic blocks, implemented at least in part in hardware, to control at least a portion of physical functions of a machine; tools to identify soft errors at the one or more computing logic blocks and generated soft error rate data based on the soft errors; a functional safety manager tool to: categorize soft errors described in the soft error rate data according to a set of categories; identify one or more vulnerability factors corresponding to the soft errors; perform derating of the soft error rate data using corresponding vulnerability factors to generate derated error rate data for each of the set of categories; determine a functional safety metric from the derated error rate values; and determine whether the functional safety metric violates a rule based on threshold for the functional safety metric.

Example 41 includes the subject matter of example 40, further including a system-on-chip (SOC) device, where the one or more computing logic blocks include intellectual property (IP) blocks of the SOC device.

Example 42 includes the subject matter of any one of examples 40-41, where the functional safety metric is defined by an industrial standard.

Example 43 includes the subject matter of example 42, where the industrial standard includes one of ISO 26262 or IEC 61508.

Example 44 includes the subject matter of any one of examples 40-43, where the set of vulnerability factors include an architecture vulnerability factor (AVF), a time vulnerability factor (TVF), and a program vulnerability factor (PVF).

Example 45 includes the subject matter of any one of examples 40-44, where the set of categories include detectable correctable errors (DCE), detectable uncorrectable errors (DUE), and silent data corruption (SDC).

Example 46 includes the subject matter of example 45, where: the one or more vulnerability factors include an architecture vulnerability factor (AVF), a time vulnerability factor (TVF), and a program vulnerability factor (PVF); and the functional safety value includes a residual fault rate value for at least a particular one of the one or more hardware components.

Example 47 includes the subject matter of example 46, where the functional safety value includes a residual fault rate value for at least a particular one of the one or more hardware components.

Example 48 includes the subject matter of example 47, where the residual fault rate value is based on a derated error rate value determined for SDC errors of the particular hardware component.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine-readable storage medium with instructions stored thereon, wherein the instructions are executable by a machine to cause the machine to:
   access soft error data, wherein the soft error data describes soft errors predicted to affect at least a particular hardware component of a computing system, wherein the computing system is to control at least a portion of physical functions of a machine using the particular hardware component;
   determine respective soft error rates for each of a set of classifications based on the soft errors described in the soft error data;
   perform derating of the soft error rates based on a set of vulnerability factors to generate derated error rate values for each of the set of classifications, wherein the set of vulnerability factors comprise an architecture vulnerability factor (AVF), a time vulnerability factor (TVF), and a program vulnerability factor (PVF);
   determine a functional safety value from the derated error rate values; and
   determine whether a functional safety threshold is violated based on the functional safety value.

2. The storage medium of claim 1, wherein the set of classifications comprise detectable correctable errors (DCE), detectable uncorrectable errors (DUE), and silent data corruption (SDC) errors.

3. The storage medium of claim 2, wherein the functional safety value comprises a residual fault rate value for at least the particular hardware component.

4. The storage medium of claim 3, wherein the residual fault rate value is based on a derated error rate value determined for SDC errors of the particular hardware component.

5. The storage medium of claim 1, wherein the instructions are further executable to cause the machine to determine an aggregate functional safety value for the computing system from a respective functional safety value determined for each one of a plurality of components of the computing system, wherein the plurality of components comprise the particular hardware component.

6. The storage medium of claim 5, wherein the functional safety threshold comprises a threshold value of the aggregate functional safety value.

7. The storage medium of claim 1, wherein the machine comprises an at least partially autonomous passenger vehicle, and the physical functions comprise one or more of steering, accelerating, or braking the vehicle.

8. The storage medium of claim 1, wherein the machine comprises a robot.

9. The storage medium of claim 1, wherein the machine comprises an at least partially autonomous drone, and the physical functions comprise one or more of steering, accelerating, or braking the drone.

10. The storage medium of claim 1, wherein the machine comprises an industrial machine.

11. The storage medium of claim 1, wherein the functional safety value comprises a metric defined under an industrial standard for the machine.

12. A method comprising:
   receiving soft error rate data, wherein the soft error rate data describes soft errors determined for one or more hardware components of a machine, and the one or more hardware components comprise logic to control at least a portion of physical functions of the machine;
   determine respective soft error rates for each of a set of classifications based on the soft errors described in the soft error data;
   identifying a plurality of vulnerability factors corresponding to the one or more hardware components, wherein the plurality of vulnerability factors comprise an architecture vulnerability factor (AVF), a time vulnerability factor (TVF), and a program vulnerability factor (PVF);
   performing derating of the soft error rate data using the plurality of vulnerability factors to generate derated error rate values for each of the set of classifications;
   determining a functional safety value from the derated error rate values; and
   determining whether the functional safety value is greater than or equal to a threshold value.

13. The method of claim 12, wherein:
   the set of classifications comprise detectable correctable errors (DCE), detectable uncorrectable errors (DUE), and silent data corruption (SDC); and
   the functional safety value comprises a residual fault rate value for at least a particular one of the one or more hardware components.

14. The method of claim 13, wherein the functional safety value comprises a residual fault coverage value ($K_{RF}$) determined according to the formula:

$$K_{RF} = \frac{DUE_{derated} + DCE_{derated}}{SDC_{derated} + DUE_{derated} + DCE_{derated}}$$

wherein $DUE_{derated}$ comprises a derated DUE rate value, $DCE_{derated}$ comprises a derated DCE rate value, and $SDC_{derated}$ comprises a derated SDC rate value.

15. The method of claim 13, wherein the functional safety value comprises a set of lambda values determined according to the formulas:

$$\lambda_{NS} = SDC_{derated} + DUE_{derated} + DCE_{derated}$$

$$\lambda_{RF} = SDC_{derated}$$

$$\lambda_{MPF} = DUE_{derated} + DCE_{derated}$$

wherein $\lambda_{NS}$ comprises a not-safe failure in time (FIT) value, $\lambda_{RF}$ comprises a residual fault FIT value, and $\lambda_{MPF}$ comprises a multi-point fault FIT value, and
wherein $DUE_{derated}$ comprises a derated DUE rate value, $DCE_{derated}$ comprises a derated DCE rate value, and $SDC_{derated}$ comprises a derated SDC rate value.

16. The method of claim 12, further comprising performing simulations on one or more models of the one or more hardware components to determine the soft error rate data.

17. A system comprising:
    at least one data processing apparatus;
    a memory;
    a functional safety analysis tool, executable by the data processing apparatus to:
        receiving soft error data, wherein the soft error data describes soft errors determined for one or more hardware components of a machine, and the one or more hardware components comprise logic to control at least a portion of physical functions of the machine;
        categorize soft errors described in the soft error data according to a set of categories;
        identify a plurality of vulnerability factors corresponding to the soft errors;
        perform derating of the soft error rate data using corresponding vulnerability factors in the plurality of vulnerability factors to generate derated error rate data for each of the set of categories;
        determine a functional safety metric from the derated error rate values; and
        determine whether a functional safety threshold is violated based on the functional safety value.

18. The system of claim 17, wherein the functional safety metric is defined by an industrial standard.

19. The system of claim 18, wherein the industrial standard comprises one of ISO 26262 or IEC 61508.

* * * * *